United States Patent [19]

Philipp

[11] 3,855,683
[45] Dec. 24, 1974

[54] METHOD OF CORRECTING ECCENTRICITY AND RUNNING OUT OF TRUE IN STAMPED STEEL WHEELS

[75] Inventor: Erich Philipp, Dabringhausen, Germany

[73] Assignee: Ford Motor Company, Dearborn, Mich.

[22] Filed: May 15, 1973

[21] Appl. No.: 360,493

[30] Foreign Application Priority Data
May 17, 1972 Germany.............................. 2224027

[52] U.S. Cl. ........................................... 29/159.01
[51] Int. Cl. .............................................. B21h 1/02
[58] Field of Search ............. 72/352, 354, 355, 393; 29/159 R, 159.1, 159.01

[56] References Cited
UNITED STATES PATENTS

| 3,530,717 | 9/1970 | Gregg ................................. 72/35 X |
| 3,580,043 | 5/1971 | Golliwitzer........................... 29/159.1 |
| 3,683,479 | 8/1972 | Le Jeune ........................... 29/159.01 |
| 3,729,795 | 5/1973 | Roper .............................. 29/159.01 |

*Primary Examiner*—Richard J. Herbst
*Attorney, Agent, or Firm*—Clifford L. Sadler; Keith L. Zerschling

[57] ABSTRACT

A method of correcting eccentricity and running out of true in a stamped steel wheel comprising supporting the dish portion of the wheel on a fixed calibrating tool, forcing segmental calibrating tools against the tire support portions of the wheel's rim and hammer pressing a movable tool against the other side of the wheel dish and against the wheel rim.

1 Claim, 1 Drawing Figure

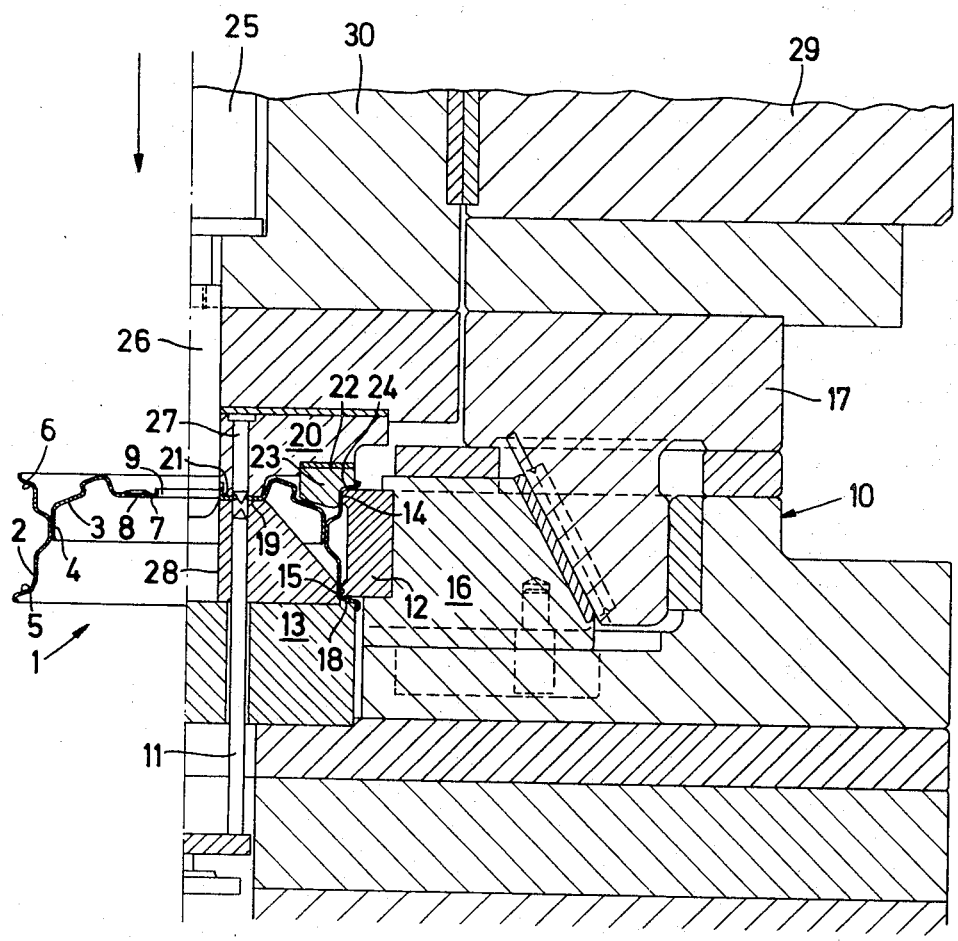

METHOD OF CORRECTING ECCENTRICITY AND RUNNING OUT OF TRUE IN STAMPED STEEL WHEELS

BACKGROUND OF THE DISCLOSURE

The present invention relates to a method of correcting eccentricity and running out of true, in disc-type stamped steel pressing wheels, in particular for motor vehicles these wheels consisting of a finish-profiled rim and a finish-formed wheel dish, these being attached to one another be spot welding, and the tire support surfaces being calibrated by a radial upsetting operation.

Already known are methods of the kind introductorily described, in which essentially finished steel pressing wheels are subjected to a calibrating or truing operation.

In one known method, the tire support surfaces are calibrated by radial upsetting using a number of calibrating segments, at the same time the center bore of the wheel dish being finish-bored.

In another known method, the tire support surfaces are calibrated by radially expanding them into contact with a calibrating ring and the wheel dish support surfaces are calibrated by an axial pressing operation using calibrating tools, the expansion being produced by the calibrating tools which act axially from both sides on the wheel dish and the rim.

In the first case, it is only eccentricity which is corrected and not running out of true, because the wheel dish support surfaces are not calibrated. However, a desirable increase in the strength of the rim is achieved by the upsetting operation.

In the second case, both eccentricity and running out of true are corrected because both the tire support surfaces and the wheel dish support surfaces are calibrated. The fact that the expansion of the rim is produced by the single-action calibrating tools results in a certain degree of spring-back on the part of the material so that the tolerances on eccentricity and true running are wider and less acceptable. Also, because of the expansion of the rim the dynamometer test figures are negatively affected.

BRIEF DESCRIPTION OF THE DISCLOSURE

It is an object of the invention to provide a method of the kind introductorily described, in which the advantages of the two aforementioned methods are achieved in a combined way, while the disadvantages of the known methods are largely avoided.

The invention commences from the known fact that material which is formed by hammer-pressing, exhibits minimum spring-back resilience.

In accordance with the invention, therefore, this object is achieved in that the tire support surfaces are calibrated by radial upsetting followed immediately by axial hammer-pressing, while the wheel dish support surfaces are calibrated at the same time by axial hammer-pressing. In hammer-pressing the wheel dish support surfaces, the countersinks for the wheel nuts can be produced at the same time.

In hammer-pressing the wheel dish support surfaces, the center bore of the wheel dish can be calibrated at the same time. A tool for carrying out the process in accordance with the invention is provided with a number of calibrating segments with calibrating faces for the tire-supporting surfaces. The calibrating segments can be displaced radially inwardly against the wheel rim through the medium of thrusters and a thrust ring. A fixed calibrating press tool is provided with calibrating faces for one rim shoulder and one side of the wheel dish support surface. A moving calibrating press tool is provided with calibrating faces for the other side of the wheel dish support surface. The moving calibrating press tool is also equipped, through the medium of a tolerance-compensating plate, with a calibrating ring and associated calibrating faces for the other rim shoulder, this moving tool being axially displaceable.

The movable calibrating press tool is provided with countersinking punches for the wheel nut countersinks.

The moving and fixed calibrating press tools are here provided with a guide for a calibrating pin, displaceable by an independent hydraulic cylinder, used for the center bore of the wheel dish.

A machine for implementing the method of the invention is equipped with a main hydraulically operated ram for closing the calibrating segments and with a hammer-press ram, disposed concentrically within the latter ram, the main ram being halted at its bottom terminal position during the two to three hammer-press strokes.

The hammer-press ram is equipped with an independently controllable hydraulic cylinder disposed concentrically within the ram itself.

Through the method of the invention, it is possible to achieve tolerances on eccentricity and trueness of disc-type steel pressing wheels, which are tighter than it was ever possible to achieve with any of the known methods.

Moreover, through the combined upsetting and hammer-pressing adopted in accordance with the invention, the strength properties of the steel pressing wheel are substantially improved so that in the normal wheel tests, such as the dynamometer test and rolling-flexing test, substantially better values are obtained.

BRIEF DESCRIPTION OF THE DRAWINGS

The invention will be explained in more detail making reference to an example illustrated in the drawing.

The drawing FIGURE illustrates a vertical section through a machine in accordance with the invention and having a tool in accordance with the invention. Calibrating tools are illustrated in action upon a steel pressing wheel.

DETAILED DESCRIPTION

A steel pressing wheel 1 illustrated at the left-hand side of the figure, consists of a profile rim 2 and a formed wheel dish 3, the two being attached to one another at 4 by spotwelding. The rim 2 has tire support surfaces 5 and 6. The wheel dish 3 has a support surface 7 as well as holes 8 for the wheel nuts and the center bore 9.

A tool 10 is provided with lift pins 11 which pick up the steel pressing wheel 1 from a conveyor and lower it down to the operating level of a number of calibrating segments 12 and a fixed calibrating tool 13. The calibrating segments 12 have calibrating faces 14 and 15 for the tire support surfaces 5 and 6, and are movable radially inwardly by means of thrusters 16 and a wedge thruster ring 17. The fixed calibrating tool 13 has a first calibrating face 18 for one rim shoulder and a second calibrating face 19 for one side of the wheel dish support surface 7.

The tool 10 consists, furthermore, of a moving calibrating press tool 20 with a calibrating face 21 for the other side of the wheel dish support surface 7, and a calibrating ring 23 with a calibrating face 24 for the other rim shoulder. A tolerance-compensating plate 22 is interposed between the calibrating ring and the moving calibrating press tool 10.

The tool 10 also includes a calibrating broach 26 concentrically located in the moving calibrating tool 20 and displaceable independently by a hydraulic cylinder 25. The broach 26 is provided for the center bore 9. The tool 10 further includes countersink tools 27 arranged in the calibrating tool 20, for the wheel nut or bolt holes 8. The calibrating broach 26 is guided in a guide 28 in the fixed calibrating tool 13.

The machine for performing the process in accordance with the invention has a main ram 29 with a hydraulic drive system and a hammer-press ram 30 arranged concentrically within same.

OPERATION

The finished, spot-welded steel pressing wheel 1 is introduced by a conveyor into the tool 10 and lowered by the lift pins 11 down to the level of the calibrating segments 12. The calibrating segments 12 are then closed against the wheel 1 by traversing the main ram 29 downwardly upon the wedge thruster ring 17 and which, in turn, forces the thrusters 16 radially inwardly whereby the segments 12 calibrate the tire support faces 5 and 6 of the rim 2 by upsetting. The main ram 29 then remains in its bottom terminal position as shown.

The calibrating broach 26 for the center bore 9 of the wheel dish 3 moves into the operating position, prior to the first hammer-press stroke, and calibrates the internal diameter (already holed out to a certain allowance diameter) of the center bore 9. The calibrating broach 26 remains in the operative position during the hammer-press strokes. Then, the hammer-press ram 30 carries out 2 or 3 strokes and, thus, trues up wheel dish 3 and rim 2 by accurately forming the dish and rim to the dimensions established by the pairs of mating calibrating faces 19-21, 15-18 and 14-24.

Simultaneous with the hammer-press stokes, the countersinks for the wheel nut holes 8 are produced by the countersinking tools 27.

After the last hammer-press stroke, the calibrating broach 26 is withdrawn, the hammer-press ram 30 and the main ram 29 move into their upper terminal positions, and the calibrating segments 12 are retracted by means of a positive return device provided between the wedge thruster ring 17 and the thrusters 16. The lift pins 11 raise the steel pressing wheel 1 from the tool 10 back to the transfer height. A conveyor device picks up the wheel 1 and removes it from the machine. The lift pins 11 remain in their upper position until the next steel pressing wheel 1 is picked up from the conveyor.

The speeds now being reached by modern mass-produced vehicles necessitate ever more stringent restrictions upon the eccentricity and true running tolerances that can be permitted in the manufacture of disc-type steel pressing wheels for motor vehicles. The present invention provides a method of correcting eccentricity and running out of true, in steel pressing wheels of this kind. This new method makes it possible to adhere to tight tolerances in the manufacture of such wheels and provides positive improvements in the results of the test procedures used in testing strength such as the dynamic test and the rollingflexing test.

The foregoing description presents the presently preferred embodiment of this invention. Alterations and modifications may occur to those skilled in the art which will come within the scope and spirit of the following claims.

I claim:

1. A method of correcting eccentricity and running out of true in a disc-type steel pressing wheel, said wheel comprising a rim and a wheel dish, said rim having first and second spaced apart tire supporting surfaces and first and second spaced apart shoulders, said wheel dish having a center bore and an outer edge, said rim being connected to said wheel adjacent said outer edge, said wheel dish having first and second annular support surfaces adjacent said center bore, said method comprising the steps of supporting one side of said wheel on a supporting calibrating tool, said supporting calibrating tool having a first calibrating face engaging said first support surface and a second calibrating face engaging said first shoulder, said supporting calibrating tool being spaced apart from the surface of said wheel between said first support surface and said first shoulder, radially moving a plurality of segmental calibrating tools into engagement with said tire support surfaces of said rim at circumferentially spaced locations, each of said segmental calibrating tools having first and second arcuate axially spaced calibrating faces engaging said first and second tire support surfaces, said segmental calibrating tools being spaced apart from the surface of said rim between said first and second tire support surfaces when said calibrating tool is moved into engagement with said rim, inserting a center bore calibrating tool into said center bore, multiple stroke hammer pressing an axially movable calibrating tool against the other side of said wheel, said movable calibrating tool having a first calibrating face striking said second support surface and a second calibrating face striking said second shoulder, said movable calibrating tool being spaced apart from the surface of said wheel between said second support surface and said second shoulder when said movable calibrating tool is in hammer pressing engagement with said wheel, holding said center bore calibrating tool in said center bore during said hammer pressing, removing said center bore calibrating tool from said center bore after said hammer pressing is completed, whereby said wheel rim and said wheel dish are accurately dimensioned and located with respect to each other.

* * * * *